United States Patent [19]

Belliveau, Sr.

[11] 4,180,279
[45] Dec. 25, 1979

[54] BICYCLE HITCH FOR CONNECTION TO A TRAILER

[76] Inventor: Joseph W. Belliveau, Sr., 3701 SW. 88 Ct., Miami, Fla. 33165

[21] Appl. No.: 910,376

[22] Filed: May 30, 1978

[51] Int. Cl.² ............................................. B62K 27/12
[52] U.S. Cl. ................................... 280/204; 280/492
[58] Field of Search ............... 280/204, 292, 492, 494, 280/498, 499

[56] References Cited

U.S. PATENT DOCUMENTS

| | | | |
|---|---|---|---|
| 2,756,069 | 7/1956 | Manngarn | 280/204 |
| 4,037,853 | 7/1977 | Sparks | 280/204 |

FOREIGN PATENT DOCUMENTS

| | | | |
|---|---|---|---|
| 438701 | 5/1912 | France | 280/204 |
| 834947 | 12/1938 | France | 280/204 |
| 1053102 | 2/1954 | France | 280/204 |
| 344355 | 3/1931 | United Kingdom | 280/204 |

Primary Examiner—Joseph F. Peters
Assistant Examiner—Randall A. Schrecengost

[57] ABSTRACT

A bicycle hitch for connection to a trailer including a fork having an upstanding stem to be aligned vertically with respect to the plane through the axles of the bicycle and a rearwardly and downwardly extending pair of members in telescopic relation wherein the inner member is attached to the stem of the fork and the rearward end is headed to captivate the outer member slidably and rotatably thereon and wherein said telescoping members extend rearwardly and downwardly at an angle of 64½° beyond the rear wheel of a bicycle and is provided with a downwardly extending member to be vertically oriented parallel to said fork and a draw bar is provided extending rearwardly at a connection at the plane defined by the centerlines of the bicycle wheels and anchor means are provided to vertically orient the fork.

5 Claims, 3 Drawing Figures

BICYCLE HITCH FOR CONNECTION TO A TRAILER

FIELD OF THE INVENTION

This invention relates to a hitch for bicycles for hauling a trailer.

BACKGROUND OF THE INVENTION

In the past there have been numerous efforts to provide hitches for pulling trailers by a bicycle. The problem has been that when the bicycle is leaned for turning, the hitch does not transmit a pulling force solely and tends to tip the trailer causing damage. This invention is of an improved hitch wherein turns may be made of the bicycle while pulling the trailer.

It has been found that a suitable hitch is composed of a vertical forked member which is held in a vertical position and a rearwardly and downwardly extending telescopic arrangement composed of an inner member having a headed rearward end and a sleeve member wherein the angle between it and the fork is of $64\frac{1}{2}°$ and the sleeve is slidable and rotatable and includes a downwardly extending hitch portion rearwardly of the rear wheels for connection to the draw bar of a trailer at about the plane defined by the centerline of the bicycle wheels. It has been found that the utilization of such a structure renders it possible to drive a bicycle carrying a trailer utilizing the hitch described more fully hereinafter and that turns may be readily accomplished by the combination.

In accordance with the foregoing, it is an object of this invention to provide an improved hitch for a bicycle to connect a trailer to the rear wheels for towing the same which is in accordance with the following description for the purposes set forth above which is simple and inexpensive to install, is composed of easily assembled parts and which is simple and inexpensive to manufacture and well adapted for the purposes for which it is intended.

In accordance with these and other objects which will become apparent hereinafter, the instant invention will now be described with reference to the accompanying drawings in which:

DESCRIPTION OF THE PREFERRED EMBODIMENT

Figure 1:
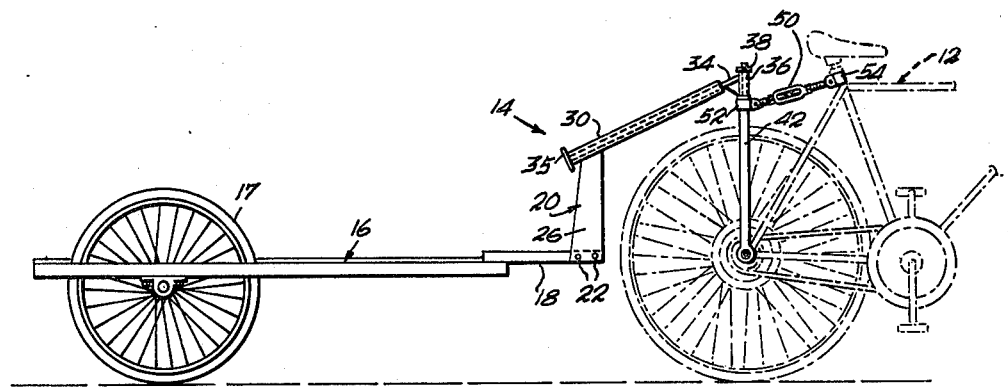
FIG. 1 is a side elevation view of the instant invention and illustrating the same attached to the rear axle of a bicycle shown in chain dot lines.
Figure 2:
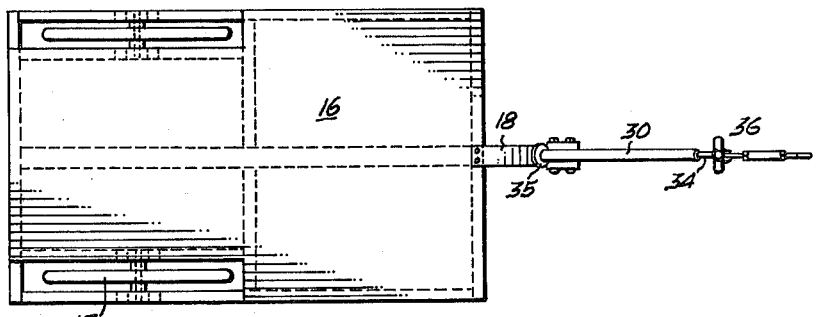
FIG. 2 is a top plan view of FIG. 1.
Figure 3:
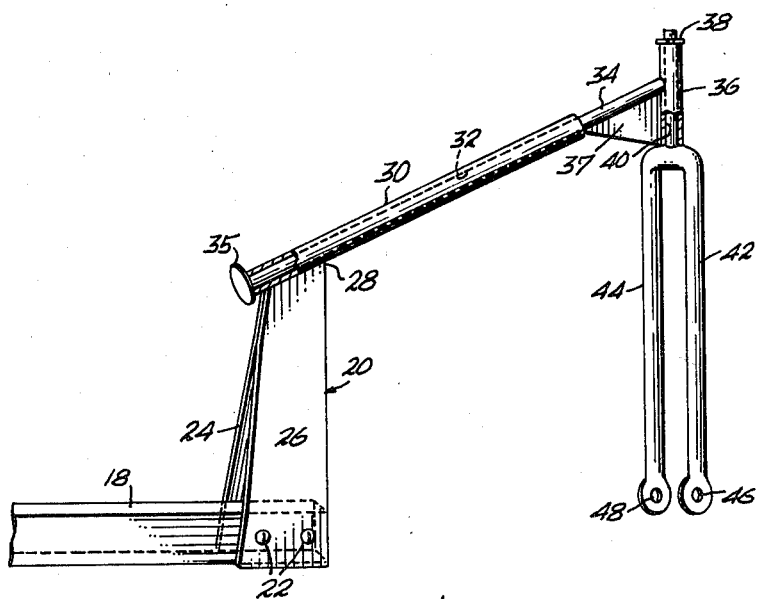
FIG. 3 is a perspective view illustrating the instant invention.

Referring to the drawings wherein like reference characters designate like or corresponding parts throughout the several views, there is shown in chain dot line the rear wheel zone of a bicycle, see FIG. 1. The instant invention is for attachment to the rear axle of the bicycle, which is designated by the numeral 12. The hitch is generally designated by the numeral 14 and a trailer 16 is to be drawn by the bicycle, the trailer having rear wheels, such as that designated by the numeral 17. The trailer is provided with a draw bar 18 and the hitch 14 includes a vertical member 20 composed of two downwardly diverging plates 24 and 26 which are rigidly connected to the draw bar 18 as by the bolts 22.

To the upper end 28 there is connected the downwardly and rearwardly extending longitudinal member 30, which is of sleeve form and within which there is rotatably and longitudinally slidable a rod 32 having an upper end 34 rigidly connected to a vertical sleeve 36 and this rod is captivated in the sleeve 30 by a headed rearward end 35. In the preferred embodiment the upper end of the sleeve 36 is provided with a keeper 38 and an internal bore 40 slidably receives the upper stem zone of a fork having bifurcated lower ends 42 and 44 which terminate at terminal ends 46 and 48 in which holes are provided to connect to the rear axle and be held in position by means of suitable nuts. To maintain the fork composed of the legs 42 and 44, a turn buckle 50 is provided having a first end 52 to connect about the fork leg and an end 54 to connect about the seat stem of the bicycle and to be turned to orient the fork legs into the upright position shown in FIG. 1.

It is thus seen that there is provided an attachment for a bicycle having a rear wheel axle, a hitch for a trailer. The hitch is composed of a fork, the legs of which have a bifurcated length greater than the diameter of the rear bicycle wheel and having a lower end and an upper end. The lower end is adapted to be attached to the rear wheel axle of the bicycle and the upper end is provided with a turning stem. Suitable means in the form of bolts are provided to mount the fork to the rear axle with holes 46 and 48 receiving the axle and being secured by bolts in the preferred embodiment. To the upper end of the stem of the bifurcated fork, a first sleeve is mounted about the turning stem. The rearward downwardly extending, rigid elongate rod 34 is connected at its upper end to the sleeve about the turning stem and it is arranged at an angle between the vertical and its longitudinal centerline at an angle of $64\frac{1}{2}°$ and it is of a length to extend beyond the vertical tangent to the rear wheel, preferably extending at least 2 inches beyond said vertical tangent and preferably about 4 inches. About the rearwardly and downwardly extending rod the elongate second sleeve 30, which is of a length shorter than the rod, is rotatably and slidably arranged and limited with respect to movement along the rod by stop means 35 at one end and the connection to the first sleeve at the upper end. Extending downwardly from the sleeve 30 there is the vertical portion generally designated by the numeral 20 and composed of the bifurcated plates 24 and 26 which are of a length extending to the centerline through the bicycle wheels; and bolts 22 are provided for attachment to the draw bar 18 of the trailer generally designated by the numeral 16.

What is claimed is:

1. For a two wheeled bicycle type vehicle having a single rear wheel and rear axle, a trailer hitch, said hitch comprising a vertical fork of a length greater than the radius of the rear wheel and said fork having a lower end and an upper end, said lower end being adapted for attachment to the rear wheel axle of a bicycle and said upper end comprising an upstanding vertical turning stem;

means to mount the fork to the rear axle;
    a first sleeve about the turning stem;
    a rigid elongate member having a first end and a second end and having a longitudinal axis, said rigid elongate member extending rearwardly and downwardly from the first sleeve at an angle between the vertical of between 64 and 65 degrees and of a length sufficient to extend beyond the vertical tangent to the rear bicycle wheel, said member being rigidly attached to said first sleeve at the first end;

an elongate second sleeve about the member, said second sleeve being of a length shorter than said member and rotatable and slidable along the rigid member, said second sleeve having a front and rear end, stop means to limit sliding movement along the member of said second sleeve;

a depending hitch member having a vertical portion connected rigidly to the second sleeve rearwardly of the bicycle wheel and adjacent the rear end and of a length extending to the centerline of the bicycle wheels for attachment to a draw bar of a trailer; and means to anchor the fork in a vertical attitude.

2. The device as set forth in claim 1 wherein the means to anchor comprises a turn buckle connected to said first sleeve and to said bicycle.

3. The device as set forth in claim 1 wherein said depending hitch member comprises a pair of diverging downwardly extending plate members and bolt means are provided to connect the lower end of the plate member to the draw bar of a trailer.

4. The device as set forth in claim 3 wherein trailer means including wheels are connected to said draw bar.

5. The device as set forth in claim 1 wherein said stop means comprises a head on the second end of said rigid member to captivate said first sleeve about said rigid member.

* * * * *